United States Patent
Snyder

(10) Patent No.: US 10,028,609 B2
(45) Date of Patent: Jul. 24, 2018

(54) VESSEL FOR SOUS VIDE COOKING ON AN INDUCTION COOKTOP WITH MAGNETIC STIRRING AND WIRELESS TEMPERATURE CONTROL

(71) Applicant: WHIRLPOOL CORPORATION, Benton Harbor, MI (US)

(72) Inventor: Joseph Snyder, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 108 days.

(21) Appl. No.: 14/984,375

(22) Filed: Dec. 30, 2015

(65) Prior Publication Data

US 2017/0188743 A1 Jul. 6, 2017

(51) Int. Cl.
| | |
|---|---|
| *H05B 6/12* | (2006.01) |
| *A21B 7/00* | (2006.01) |
| *A47J 27/10* | (2006.01) |
| *H05B 6/06* | (2006.01) |

(52) U.S. Cl.
CPC ............. *A47J 27/10* (2013.01); *H05B 6/065* (2013.01); *H05B 6/1209* (2013.01)

(58) Field of Classification Search
CPC ...... H05B 6/065; H05B 6/1209; H05B 6/129; H05B 6/12; A47J 27/10; A47J 43/0465; A47J 43/0777; A47J 43/085
USPC .......... 219/621, 622, 647; 99/348, 357, 340, 99/341, 342
See application file for complete search history.

(56) References Cited

U.S. PATENT DOCUMENTS

| | | | | |
|---|---|---|---|---|
| 5,549,382 A | * | 8/1996 | Correia, II | ........ B01F 11/0082 1/82 |
| 5,974,953 A | * | 11/1999 | Messerli | ................ A47J 27/05 99/340 |
| 2009/0027997 A1 | * | 1/2009 | Meier | ................ B01F 3/04539 366/281 |
| 2010/0303986 A1 | * | 12/2010 | De' Longhi | ........ A47J 37/1209 219/436 |
| 2011/0185915 A1 | | 8/2011 | Eades et al. | |
| 2012/0045561 A1 | * | 2/2012 | Zimmerman | ......... A47J 36/165 99/348 |

(Continued)

FOREIGN PATENT DOCUMENTS

| | | |
|---|---|---|
| EP | 2133139 | 12/2009 |
| JP | 2009131366 A * | 6/2009 |
| WO | 2014037451 A2 | 3/2014 |

*Primary Examiner* — Hung D Nguyen
(74) *Attorney, Agent, or Firm* — Price Heneveld LLP

(57) ABSTRACT

A sous vide cooking device includes an induction hob having a housing with a cooking surface. One or more heating elements are disposed within the housing adjacent the cooking surface. A motor is disposed in the housing. A cooking vessel assembly with inner and outer vessels is removably supported on the cooking surface. A stirring plate is rotatably received within the inner vessel. A magnetic coupling system includes an upper magnetic coupler disposed on the stirring plate, and a lower magnetic coupler disposed in the housing and operably coupled to the motor. The lower magnetic coupler is configured to rotate the upper magnetic coupler and the stirring plate within the cooking vessel as powered by the motor. A wireless temperature measuring device is coupled to the outer vessel for measuring a water temperature within the cooking vessel assembly.

17 Claims, 8 Drawing Sheets

(56) References Cited

U.S. PATENT DOCUMENTS

| | | | |
|---|---|---|---|
| 2012/0240790 A1* | 9/2012 | Difante | A47J 37/1295 |
| | | | 99/413 |
| 2013/0001220 A1* | 1/2013 | Alet Vidal | A47J 43/0465 |
| | | | 219/622 |
| 2014/0203010 A1 | 7/2014 | Alet Vidal et al. | |
| 2015/0000534 A1* | 1/2015 | Hager | A47J 36/165 |
| | | | 99/328 |
| 2015/0027319 A1 | 1/2015 | Wu | |

* cited by examiner

US 10,028,609 B2

VESSEL FOR SOUS VIDE COOKING ON AN INDUCTION COOKTOP WITH MAGNETIC STIRRING AND WIRELESS TEMPERATURE CONTROL

BACKGROUND

Known sous vide cooking devices, or water bath cooking vessels, generally provide heated water for cooking food items sealed in plastic enclosures. Such devices may involve an immersion circulator or be a static vessel that does not include a stirring mechanism. These devices often do not provide a homogenous cooking temperature, thereby creating the possibility of cold spots and food safety concerns. The present concept relates to a sous vide cooking apparatus having an induction hob and a magnetic stirrer used in conjunction with a dual cooking assembly vessel for providing a homogenous temperature for sous vide cooking.

SUMMARY

One aspect of the present concept includes a sous vide cooking device having an induction hob with a housing and a cooking surface. One or more heating elements are disposed within the housing adjacent the cooking surface. A motor is disposed in the housing. A cooking vessel is removably supported on the cooking surface. A stirring plate is rotatably received within the cooking vessel. A magnetic coupling system includes an upper magnetic coupler disposed on the stirring plate and a lower magnetic coupler disposed in the housing and operably coupled to the motor. The upper and lower magnetic couplers are magnetically coupled using one or more magnets when the cooking vessel is received on the cooking surface of the housing. The lower magnetic coupler is configured to rotate the stirring plate within the cooking vessel as powered by the motor.

Another aspect of the present concept includes a sous vide cooking device having an induction hob with a housing and an upper cooking surface. One or more heating elements are disposed within the housing adjacent the cooking surface. A cooking vessel assembly is supported on the cooking surface and configured to hold an amount of water for heating by the one or more heating elements. The cooking vessel assembly includes an inner vessel received within a cavity of an outer vessel. A gap is defined between outer surfaces of the inner vessel and inner surfaces of the outer vessel. A stirring plate is received within a cooking cavity of the inner vessel and is rotatably supported therein. The stirring plate includes an upper magnetic coupler and one or more blade members disposed thereon. A lower magnetic coupler is disposed in the housing and operably coupled to a motor for powering rotation of the lower magnetic coupler within an interior of the housing, wherein the upper and lower magnetic couplers are magnetically coupled using one or more magnets when the cooking vessel assembly is received on the upper cooking surface of the housing. The water within the cooking vessel assembly is circulated along a water circulation path that is partially defined by the gap between the inner vessel and outer vessel upon rotation of the stirring plate.

Yet another aspect of the present concept includes a sous vide cooking device having an induction hob with one or more heating elements disposed within an interior of the housing adjacent a cooking surface. An outer vessel includes a circumferential sidewall extending upwardly from a bottom wall to define a cavity. The bottom wall of the outer vessel is configured to be abuttingly supported on the cooking surface of the induction hob. An inner vessel includes a circumferential sidewall extending upwardly from a vented bottom wall to define a cooking cavity and is received in the cavity of the outer vessel. The inner vessel includes one or more stand-off features extending downwardly from the vented bottom wall of the inner vessel to abuttingly support the inner vessel on the bottom wall of the outer vessel. A gap is defined between outer surfaces of the inner vessel and inner surfaces of the outer vessel. A stirring plate is received within the cooking cavity and configured for rotation therein, such that water disposed within the outer vessel is circulated upon rotation of the stirring plate along a water circulation path that is partially defined by the gap between the inner vessel and outer vessel and is further defined through the vented bottom wall of the inner vessel.

These and other features, advantages, and objects of the present device will be further understood and appreciated by those skilled in the art upon studying the following specification, claims, and appended drawings.

DETAILED DESCRIPTION OF EMBODIMENTS

Figure 1:
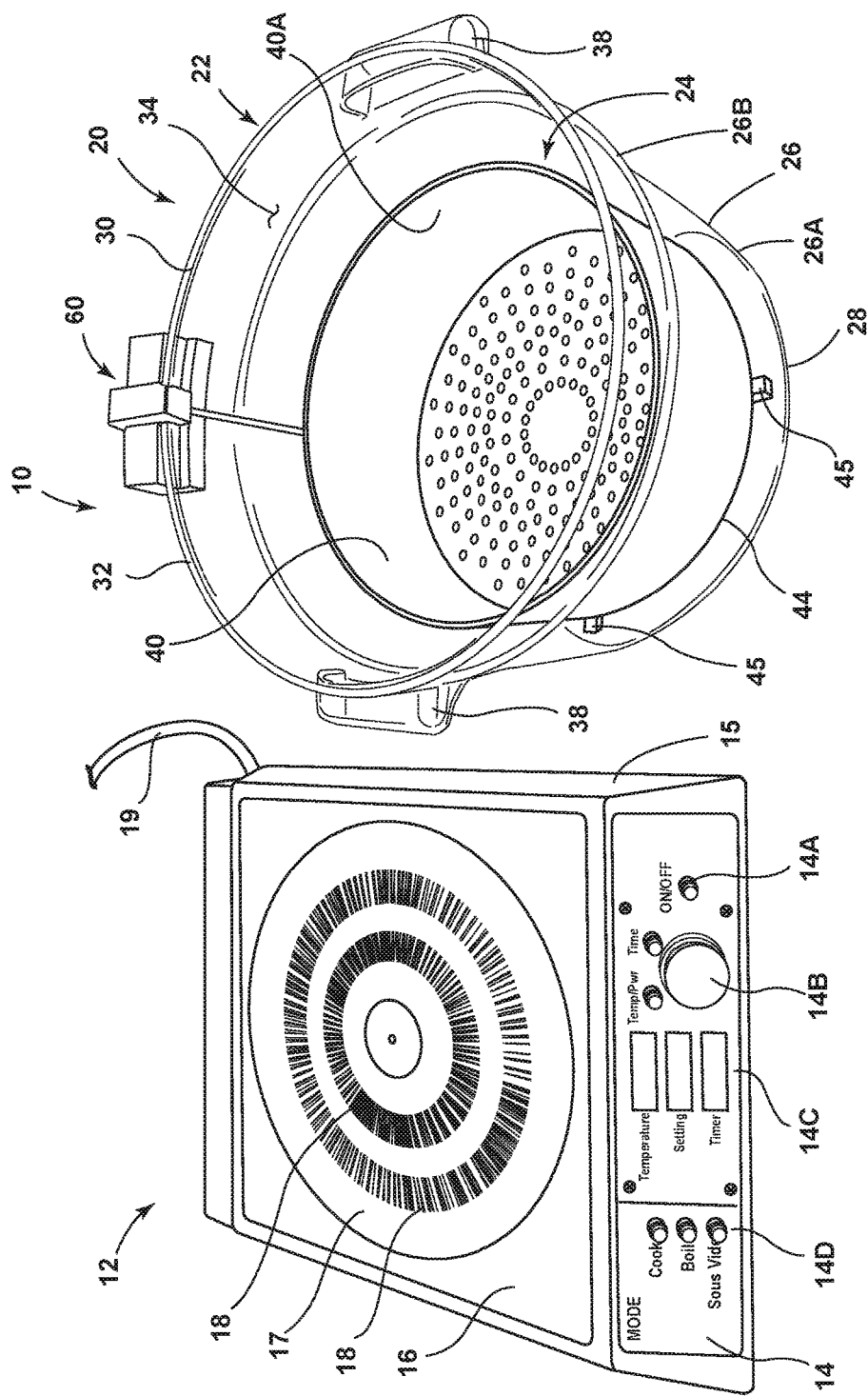
FIG. 1 is a perspective view of a sous vide cooking device having an induction hob and a cooking vessel.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIG. 1, a sous vide cooking device 10 is shown having an induction hob 12 with a user interface 14 disposed on a front portion thereof. The user interface 14 is used to control heating elements disposed within a housing 15 for heating a cooking surface 16. The cooking surface 16 is an upper planar surface having a generally centrally disposed heating zone 17 with a plurality of inductors 18 disposed thereunder which are configured to provide heat to the cooking surface 16, and also detect the presence of a cooking vessel known in the art. The cooking surface 16 is contemplated to be a heat resistant surface under which the inductors 18 are disposed in a generally circular array. The induction hob 12 further includes a power cord 19 for connecting the induction hob 12 with a receptacle for powering the electric components of the induction hob 12. Once powered, a user may initiate a cooking sequence using an on/off switch 14A, a settings dial 14B, a display array 14C, and a mode selection 14D disposed on the user interface 14 for controlling the heat elements or inductors 18. It is contemplated that the heat source of the device 10 may also include other forms of heat beyond the use of inductors 18, such as solid state inverters operated at ultrasonic frequencies for producing an alternating magnetic field capable of generating heat in a metallic utensil.

With further reference to FIG. 1, a cooking vessel 20 is shown having an outer vessel 22 and an inner vessel 24 received within the outer vessel 22. The outer vessel 22 includes a generally circular sidewall 26 extending upwardly from a bottom wall 28. The outer vessel 22 includes an open top 30 having an upper rim 32 such that the component parts of the outer vessel 22 generally define a cavity 34 in which the inner vessel 24 is received. In the embodiment shown in FIG. 1, the sidewall 26 includes a lower portion 26A and an upper portion 26B, wherein the upper portion 26B has a generally larger diameter as compared to the lower portion 26A. The overall shape of the outer vessel 22 is generally tapered from the upper rim portion 32 to the bottom wall 28. Handles 38 are disposed on the upper portion 26B of the sidewall 26 and are configured to be engaged by a user for positioning the outer vessel 22 on the cooking surface 16 of the induction hob 12 for abutting support thereon. The outer vessel 22 is contemplated to be a polymeric vessel which is substantially transparent, and is configured to hold water for a sous vide cooking procedure.

Figure 2:
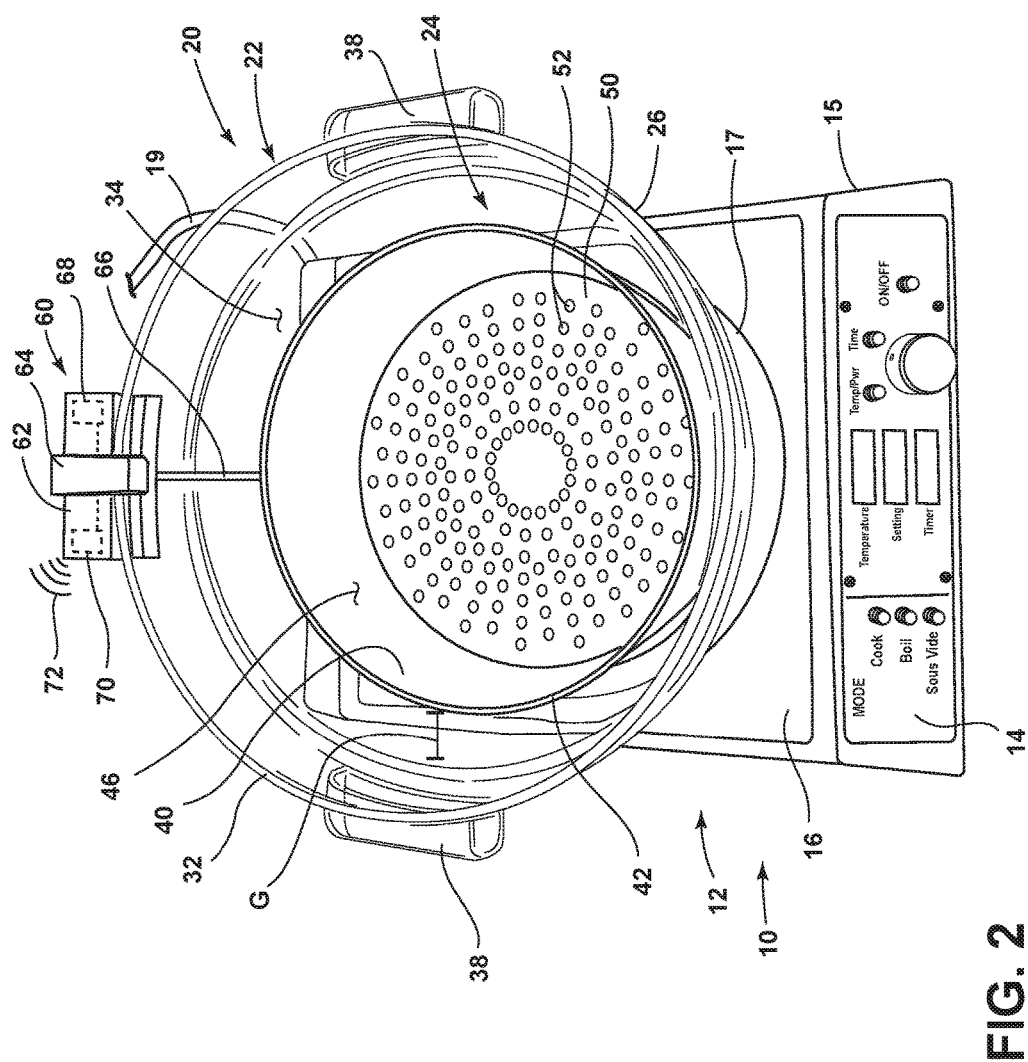
FIG. 2 is a perspective view of the sous vide cooking device with the cooking vessel positioned on the induction hob.

Referring now to FIG. 2, the cooking vessel 20 is shown supported on the cooking surface 16 of the induction hob 12. The bottom wall 28 of the outer vessel 22 is contemplated to be positioned over the inductors 18 (FIG. 1) located within the centrally disposed heating zone 17. The inner vessel 24 generally comprises a sidewall 40 that is substantially circular and tapered from an upper rim 42 towards a bottom wall 44 (FIG. 1) to define a cooking cavity 46. A support grate 50 is shown disposed within the cooking cavity 46 of the inner vessel 24 and includes a plurality of apertures 52 therethrough to provide for circulation of water through the support grate 50. In use, the support grate 50 is configured to support a number of food pouches which are generally disposed within the cooking cavity 46 of the inner vessel 24 for cooking using a sous vide cooking method.

As further shown in FIG. 2, a temperature measuring device 60 is shown coupled to the upper rim 32 of the outer vessel 22. The temperature measuring device 60 is a wireless or portable device that includes a body portion 62 having a support arm 64 extending outwardly therefrom. The support arm 64 is configured to abut and capture the upper rim 32 of the outer vessel 22 for supporting the temperature measuring device 60 thereon in a drop-in-place manner. A temperature probe 66 extends downwardly from the support arm 64 into a gap G defined between sidewall 26 of the outer vessel 22 and sidewall 40 of the inner vessel 24. The temperature measuring device 60 is contemplated to be a wireless device having a controller 68 that is operably coupled to a transmitter 70 for transmitting a signal 72 to the induction hob 12 for measuring and monitoring the temperature of a volume of water within the cooking vessel 20 during a cooking procedure. The signal 72 may also be sent to a mobile device for remote monitoring by a user, as further described below. The temperature measuring device 60 is contemplated to include a power source, such as a battery (FIG. 7), thereby making the temperature measuring device 60 a portable apparatus.

Figure 3:
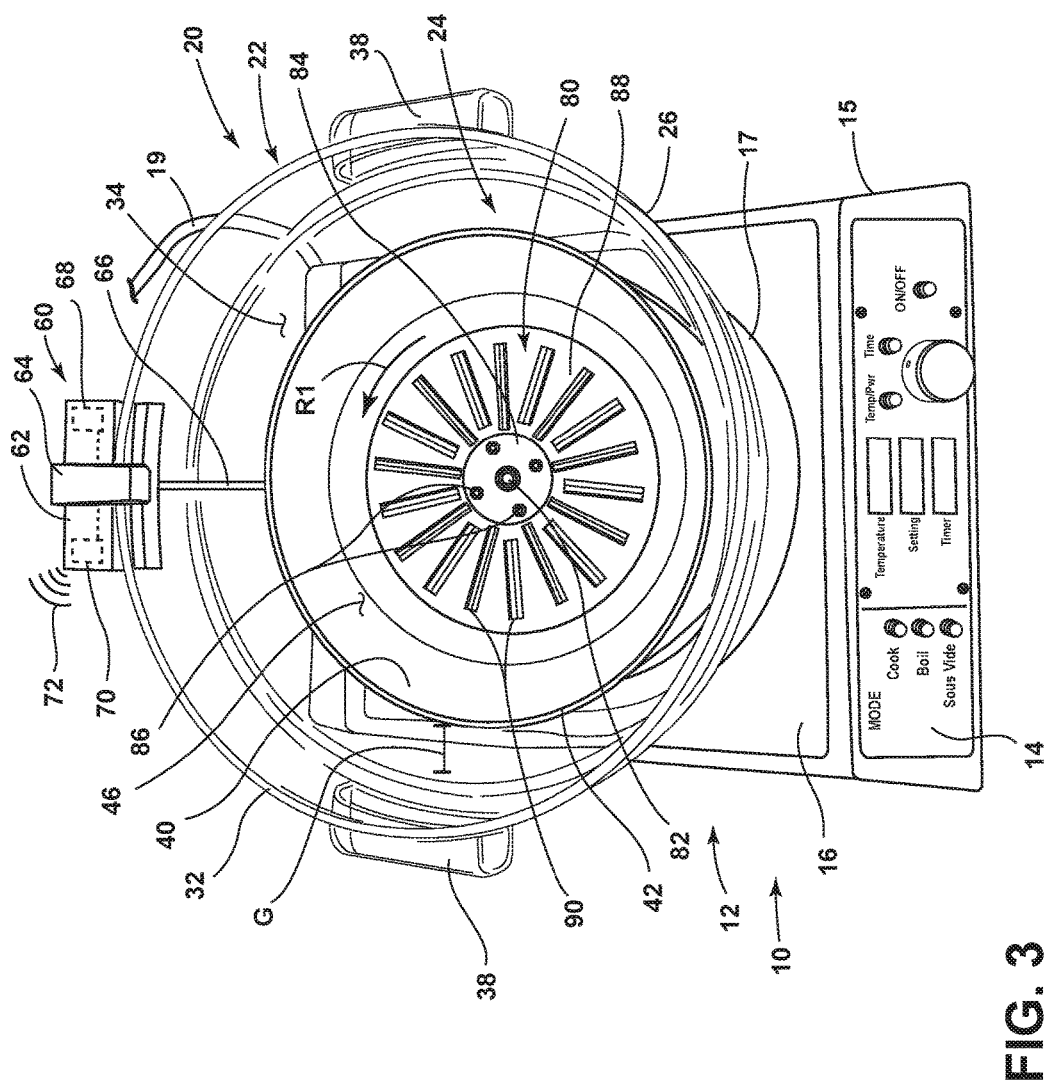
FIG. 3 is a perspective view of the sous vide cooking apparatus of FIG. 2 with a support grate removed from an inner vessel to reveal a stirring plate.

Referring now to FIG. 3, the sous vide cooking device 10 is shown with the support grate 50 (FIG. 2) removed from the inner vessel 24. With the support grate 50 removed from the inner vessel 24, a stirring plate 80 is shown. The stirring plate 80 includes a centrally disposed hub portion 82 having an upper magnetic coupler 84 coupled thereto via fasteners 86. The magnetic coupling system is identified in FIG. 6 as reference numeral 110 having upper and lower magnetic couplers 84, 102. The stirring plate 80 includes a generally planar body portion 88 that is substantially disk shaped having a plurality of blade members 90 disposed thereon. The blade members 90 include inclined surfaces and slots disposed through the body portion 88, as better shown in FIGS. 5 and 6 as described below. The stirring plate 80 is contemplated to be a magnetic stainless steel induction target that is heated by a magnetic field generated by the induction hob 12. The magnetic coupling system 110 is configured to rotate the stirring plate 80 while the stirring plate 80 is heated by the magnetic field of the induction hob 12. As the stirring plate 80 rotates in a direction as indicated by arrow R1, water is forced over the heated blade members 90. In this way, the blade members 90 not only heat the water within the cooking vessel 20, but also drive the water throughout the vessel 20 to ensure that there are no cold spots that could cause food safety concerns. In this way, the stirring plate 80 defines an impeller for circulation of water within the water bath of the cooking vessel 20 as further described below with reference to FIG. 4.

Figure 4:
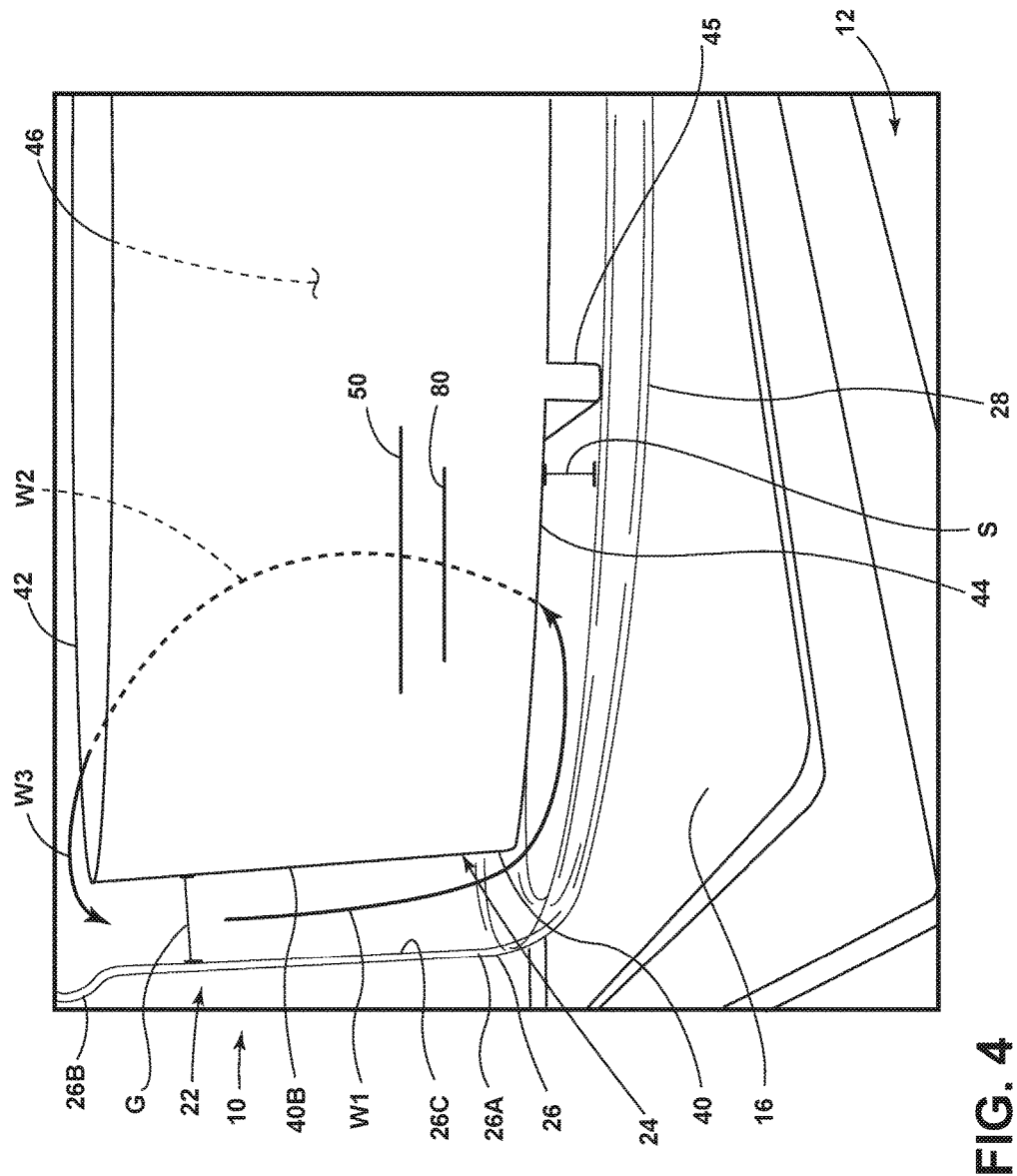
FIG. 4 is a perspective view of the cooking vessel showing relative movement along a water circulation path.

Referring now to FIG. 4, a water circulation path is shown as indicated by W1-W3. Specifically, W1 indicates a portion of the water circulation path where water is drawn downward through the gap G defined between the inner vessel 24 and the outer vessel 22. The gap G is specifically defined between inner surface 26C of sidewall 26 of the outer vessel 22, and outer surface 40B of sidewall 40 of the inner vessel 24. The water circulation path identified at W1 is drawn towards the bottom plate 44 of the inner vessel 24 which is a vented bottom plate as further shown and described below with reference to FIG. 6. Standoff features 45 extend downwardly from the bottom wall 44 of the inner vessel 24, such that the bottom wall 44 of the inner vessel 24 is spaced apart from the bottom wall 28 of the outer vessel 22. In this way, water can travel from the gap G to a spacing S defined between the bottom wall 44 of the inner vessel 24 and bottom wall 28 of the outer vessel 22. The spacing S is defined by a length of the standoff features 45 and is essentially a horizontal continuation of the vertical gap G. While the standoff features 45 are shown as an integral part of the inner vessel 24, it is contemplated that the standoff features may also extend upwardly from the bottom wall 28 of the outer vessel 22 to provide clearance for defining the spacing S between the bottom wall 44 of the inner vessel 24 and the bottom wall 28 of the outer vessel 22. Much like the gap G, the spacing S provides for water flow between the inner vessel 24 and the outer vessel 22.

As noted above, the stirring plate 80 is configured to rotate within the cooking cavity 46 defined by the inner vessel 24. The rotation of the stirring plate 80 draws water through the vented bottom wall 44 from the spacing S into the cooking cavity 46 and through the stirring plate 80 via the blade members 90 as further described below. The water is then propelled through the support grate 50 at apertures 52

(FIG. 2) by the rotation of the blade members 90 on the stirring plate 80. The path of the water circulation through the vented bottom wall 44, stirring plate 80 and support plate 50 is shown along path W2. Along path W2, the water is driven upwards towards the upper rim 42 of the inner vessel 24 and flows over the upper rim 42 towards the gap G defined between the inner vessel 24 and the outer vessel 22, as shown at circulation path W3. In this way, an amount of water in the cooking vessel 20 is continuously circulated between the inner vessel 24 and the outer vessel 22 by rotation of the stirring plate 80 during a cooking procedure to ensure homogenous cooking temperatures throughout the cooking vessel 20.

Figure 5:
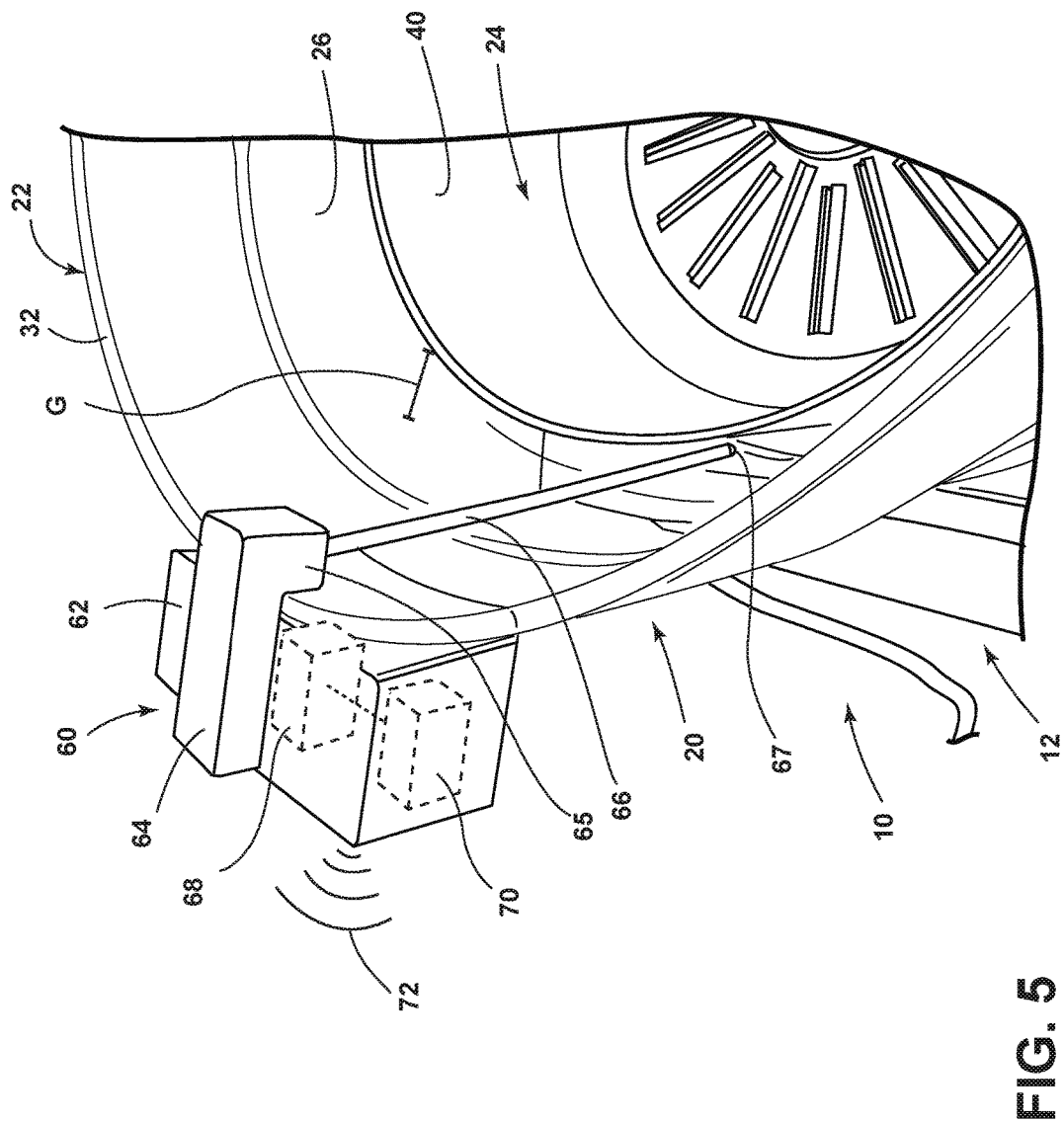
FIG. 5 is a fragmentary perspective view of the cooking vessel having a temperature probe coupled thereto.

As the water circulates within the cooking vessel 20, the temperature measuring device 60 is configured to monitor the temperature of the circulating water. Specifically, the probe 66 is disposed within the gap G between the inner vessel 24 and outer vessel 22. The probe 66 includes a temperature sensor 67 disposed at a distal end thereof. Thus, as shown in FIG. 5, the temperature sensor 67 is essentially disposed near the vented bottom wall 44 of the inner vessel 24 along circulation path W1 shown in FIG. 4. The controller 68 of the temperature measuring device 60 is contemplated to be a microcontroller which is electrically coupled to the temperature sensor 67 to processes information relative to the temperature of the water contained in the cooking vessel 20. The temperature of the water is processed by the microprocessor 68 and relayed to the induction hob 12 via an antenna shown in FIG. 5 as the transmitter 70. The transmitter 70 may be a WiFi or Bluetooth style antenna that is configured to transmit the signal 72 to the induction hob 12, such that the induction hob 12 can control the temperature of the water using proportional-integral-derivative (PID) control of the heat source of the induction hob 12, described above as the inducers 18. The temperature measuring device 60 is shown supported on the upper rim portion 32 of the outer vessel 22 at support arms 64 which is configured to positively capture the sidewall 26 by a downward extending portion 65 that is spaced-apart from the body portion 62 of the temperature measuring device 60. In this way, the temperature measuring device 60 can be set-in-place on the rim 32 of the outer vessel 22 and can be easily removed therefrom when temperature monitoring is not necessary. As noted above, the microprocessor 68 and transmitter 70 may also relay information to a mobile device, or any other electronic device for use in monitoring the temperature of water when cooking using the sous vide cooker 10.

Figure 6:
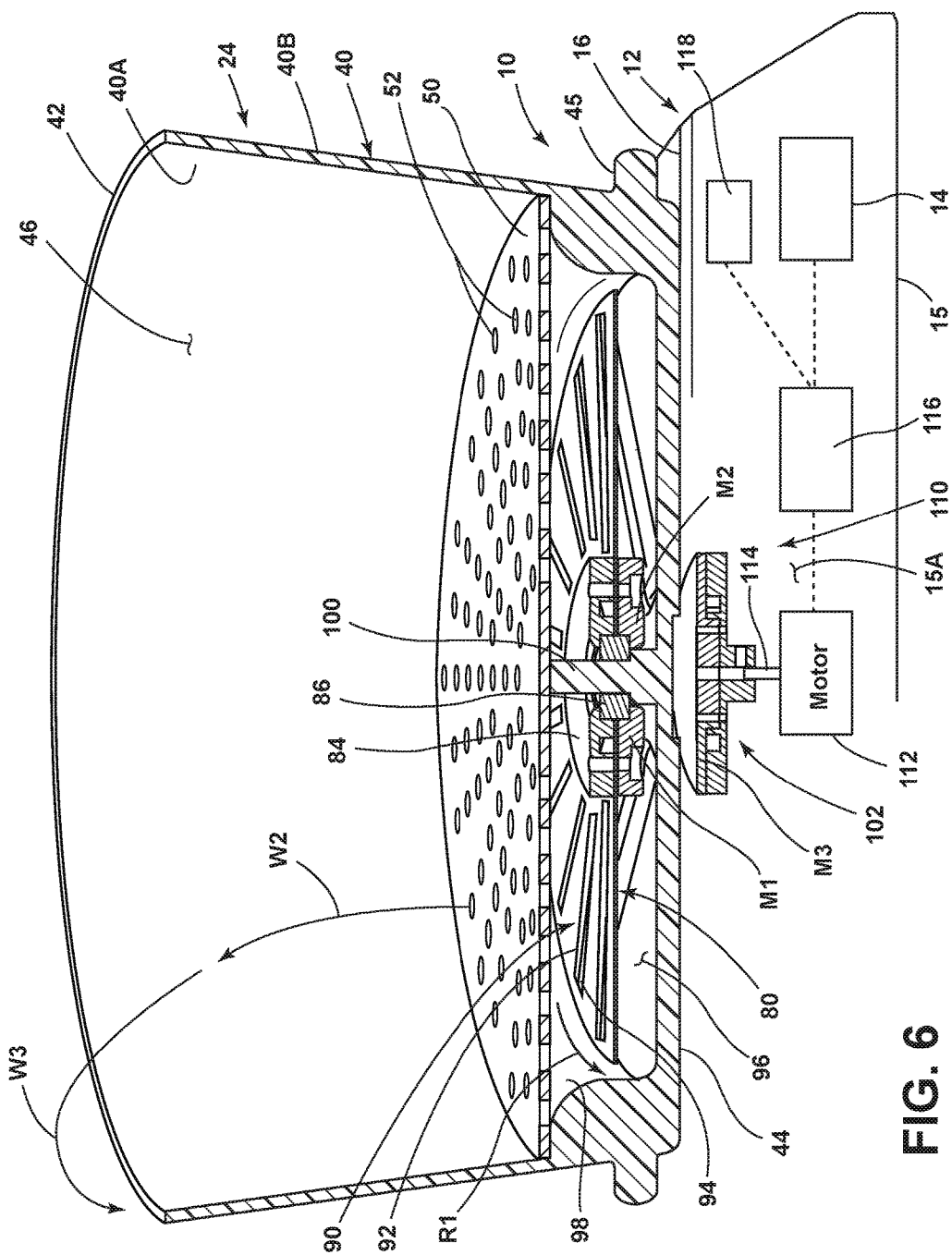
FIG. 6 is a cross-sectional view of an inner vessel of the cooking vessel having a support grate, a stirring plate and a magnetic coupler.

Referring now to FIG. 6, rotation of the stirring plate 80 will now be described. As noted above, the stirring plate 80 is configured to rotate in a direction as indicated by arrow R1 to move water along the water circulating paths as indicated along paths W1-W3. The propulsion of the water upward along the path W2 through the support grate 50 is powered by the blade members 90 which include an angled portion 92 disposed adjacent to a slot 94, such that the blade members 90 draw water through the open slot 94 and propel it upwards with the angled portion 92 through the support grate 50 and out of the inner vessel 24 over the rim portion 42 for recirculation. Water is drawn upwards towards the stirring plate 80 through the vented bottom wall 44 of the inner vessel 24 through vents 96 disposed therethrough by a vacuum created by the rotation of the blade members 90 of the stirring plate 80. It is contemplated that the bottom wall 44 of the inner vessel 24 is substantially open by a plurality of the vents 96 being disposed thereabout. In this way, water can flow freely through the vented bottom wall 44 to the cooking cavity 46 of the inner vessel 24 where a food pouch is contemplated to be received on the support grate 50 for cooking using the sous vide cooking device 10 of the present concept. The support grate 50 is shown disposed on a ledge 98 disposed around a lower portion of the inner surface 40A of sidewall 40 of the inner vessel 24. In this way, the support grate 50 is set-in-place on the ledge 98 and is easily removed for cleaning or gaining access to the stirring plate 80. The stirring plate 80 is shown disposed on a spindle 100 around which the upper magnetic coupler 84 is disposed. The upper magnetic coupler 84 may include a bearing assembly 86 for allowing rotation of the upper magnetic coupler 84 around the spindle 100. The upper magnetic coupler is contemplated to include a lower portion having magnets M1, M2, which may include a magnetizable material or permanent magnets. The magnets M1, M2 of the upper magnetic coupler 84 are contemplated to be aligned with magnets M3, or a magnetic material of a lower magnetic coupler 102, which is disposed within an interior 15A of the housing 15 of the induction hob 12. The magnets M1-M3 may include individual magnets positioned to define upper and lower magnetic arrays, continuous magnetic rings or magnetic plates.

In the embodiment shown in FIG. 5, the outer vessel 22 has been removed to show the engagement between the lower magnetic coupler 102 and the upper magnetic coupler 84. Together, the upper magnetic coupler 84, and the lower magnetic coupler 102 define the magnetic coupling system 110, wherein magnets, or magnetized material M1, M2 of the upper magnetic coupler 84 is attracted to the magnets or magnetized material M3 of lower magnetic coupler 102 to define a magnetic coupling between the upper and lower magnetic couplers 84, 102. As shown in the embodiment of FIG. 6, the upper and lower magnetic couplers 84, 102 have a generally disk shaped configuration of a prescribed diameter, such that the cooking vessel 20 will properly seat on the cooking surface 16 due to the magnetic attraction of the upper and lower magnetic couplers 84, 102. This is true even though the lower magnetic coupler 102 is disposed below the cooking surface 16 of the induction hob 12. As further shown in FIG. 1, the lower magnetic coupler 102 is operably coupled to a motor 112 via a drive shaft 114. The motor 112 is configured to rotationally drive the drive shaft 114 thereby rotating the lower magnetic coupler 102 which is fixedly coupled to the drive shaft 114. The rotation of the lower magnetic coupler 102 induces the rotation of the upper magnetic coupler 84 using a magnetic torque as compared to a conventional mechanical connection between the couplers. The rotation of the upper magnetic coupler 84 induces rotation of the stirring plate 80 as fixedly coupled thereto. The rotation of the stirring plate 80 results in circulation of water throughout the cooking vessel 20, as described above.

As further shown in FIG. 6, the induction hob 12 includes a controller 116 which is operably coupled to the motor 112 and the user interface 14. A receiver 118 is also shown in the interior 15A of the housing 15 and is operably coupled to the controller 116. The receiver 118 is contemplated to receive the signal 72 from the transmitter 70 of the temperature measuring device 60. In this way, the signal 72 from the temperature measuring device 60 can be received at the induction hob 12 at receiver 118 for further processing. An electronic signal can then be transmitted from the receiver 118 to the controller 116 for displaying a measured temperature on a display screen of the user interface 14, or for adjusting the temperature of a heating element 18 to which the controller 116 is also electrically coupled. Thus, the controller 116 can control the inducers 18 (FIG. 1) for providing PID temperature control of the water contained in the cooking vessel 20, as further described below with reference to FIG. 7.

As further shown in FIG. 6, the lower portion of the inner vessel 24 further includes a standoff feature 45 that extends outwardly from the outer surface 40B of sidewall 40. It is contemplated that the standoff feature 45 shown in FIG. 6 may be configured to rest on a ledge portion, or other like feature of the outer vessel 22 to provide the spacing S between the outer vessel 22 and inner vessel 24 as shown in FIG. 4.

With the magnetic coupling system 110 of the present concept, the cooking vessel 20 is easily placed on and removed from the cooking surface 16. Without the need for a mechanical connection to provide a circulatory system for the water within a sous vide cooking device 10, the present concept allows for proper water circulation and temperature control, without an unnecessary amount of moving parts. The lower magnetic coupler 102, shown in FIG. 6, is contained with the housing 15 of the induction hob 12 and is therefore less likely to be offset or damaged in use. The upper magnetic coupler may be fixedly coupled to the spindle 100 of the inner vessel 24, or may be set in place thereon and easily removed for proper cleaning of the inner vessel 24.

Figure 7:
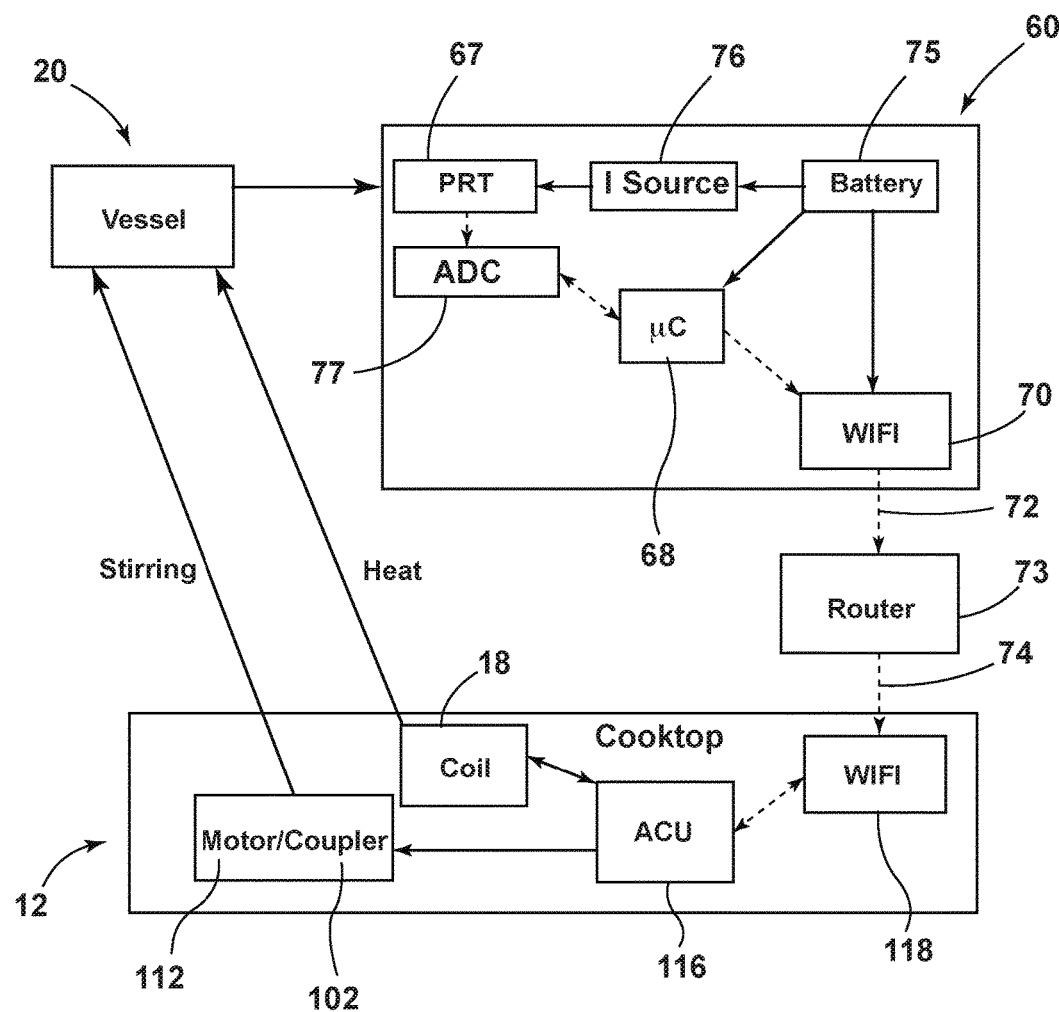
FIG. 7 is a schematic view of a sous vide cooking procedure according to one embodiment.

Referring now to FIG. 7, a schematic view of the operation of the overall sous vide cooking device 10 is shown. In this schematic view, the induction hob 12 includes a motor 112 and a coupler 102 that is driven by the motor 112. This configuration leads to the stirring of water in the vessel 20 by the coupler 102 driving the movement of a stirring plate 80 through a second coupler 84 (FIG. 6) disposed in the vessel 20. The induction hob 12 further includes a controller 116 which may be in the form of a control board identified as ACU in FIG. 7. The controller 116 powers the coil for heating the vessel 20 and the coil may be in the form of inducers 18. The temperature measuring device 60 includes a battery 75 for powering the temperature measuring device 60. Specifically, the battery 75 provides power to a direct current source 76, identified as I Source in FIG. 7. The I Source provides excitation for the temperature sensor 67 identified in FIG. 7 as a platinum resistance thermometer PRT. Other like thermometers are also contemplated for use with the temperature measuring device 60. The temperature sensor 67 is configured to sense a temperature of the water in the vessel 20 and relays that information via an electric voltage signal to an analog to digital converter 77 (ADC). The ADC 77 measures the voltage across the temperature sensor 67 and relays the same to a microcontroller 68 which is identified in FIG. 7 as μC. The microcontroller 68 includes software to convert the digital output of the ADC 77 into a temperature reading which is then conveyed to the transmitter 70. In FIG. 7, the transmitter 70 is a WiFi transmitter that sends a signal 72 having the temperature information to a router 73. The router 73 then sends a signal 74 to the receiver 118, which is shown as a WiFi receiver in FIG. 7 disposed within the induction hob 12.

Figure 8:
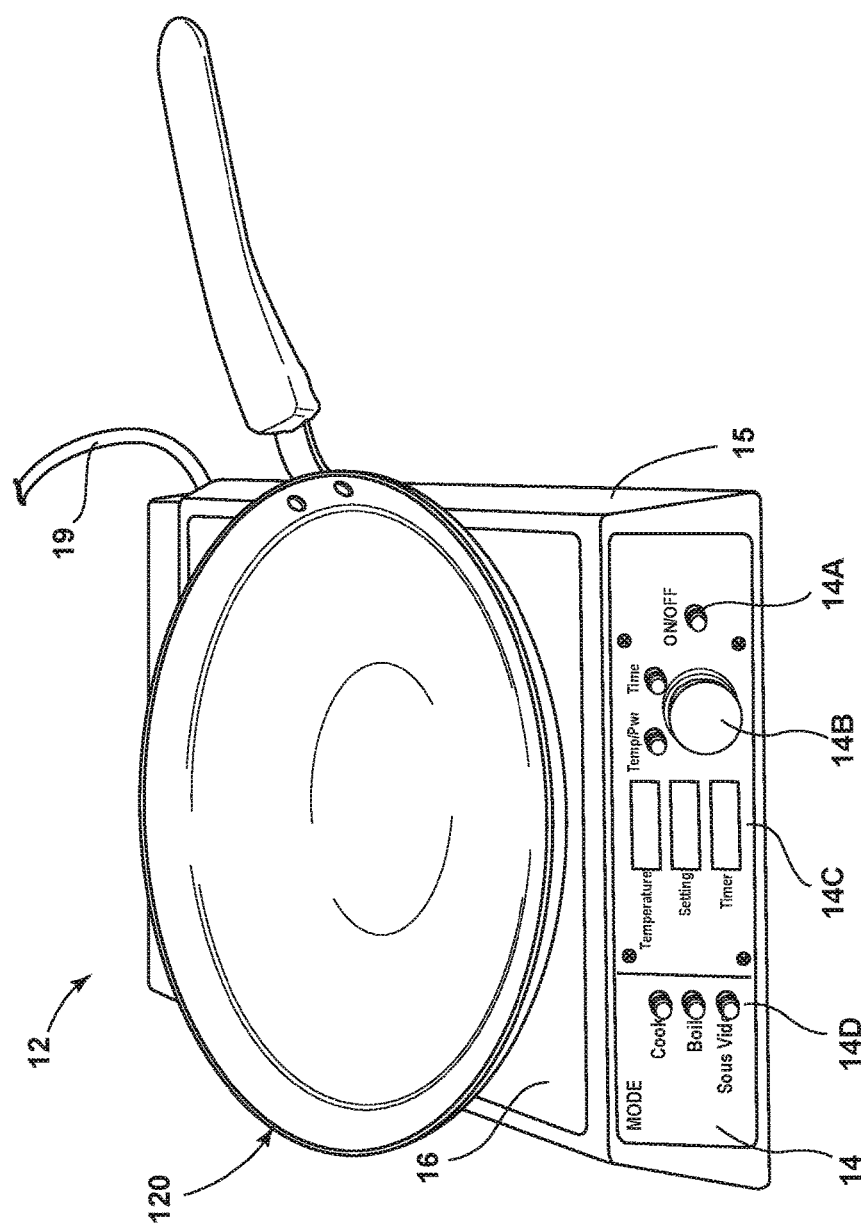
FIG. 8 is a perspective view of the induction hob of FIG. 1 having a cooking utensil disposed thereon.

Referring now to FIG. 8, the induction hob 12 is shown with a cooking utensil 120 disposed on the cooking surface 16 in the heating zone 17. The cooking utensil 120 is illustrated in FIG. 8 as a metallic frying pan which is contemplated to be an induction cookware utensil that is configured to be directly heated by the inductors 18 described above. Thus, the induction hob 12 of the present concept is configured to not only provide the sous vide cooking capabilities described above using cooking vessel 20, but also provide conventional induction cooking capabilities when used with induction cookware. In this way, the induction hob 12 can be used with the cooking vessel 20 for heating and stirring a water bath in a sous vide cooking procedure, but can also be used with induction cookware, such as cooking utensil 120, for providing a sear to food items, such as proteins. Searing meat with the cooking utensil 120 can precede or follow a sous vide cooking procedure using the same induction hob 12 as the sous vide cooking vessel 20 as determined by the user. The magnetic stirring components, such as lower magnetic coupler 102 shown in FIG. 6, of the induction hob 12 do not interfere with standard induction cooking using the cooking utensil 120. Thus, the present concept provides an induction hob 12 with a solid cooking surface 16 with no openings that would allow for food ingress into the housing 15 or other parts of the induction hob 12. Since the present concept uses a magnetic coupling system 110 (FIG. 6) no mechanical coupler openings are necessary and disposed through the cooking surface 16. It is further contemplated that the induction hob 12 of the present concept can be integrated into a larger cooktop or range cooking surface so as to incorporate the induction heating and magnetic stirring capabilities of the present concept into a seamlessly integrated cooktop having multiple cooking stations or heating zones.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A sous vide cooking device, comprising:
    an induction hob having a housing with a cooking surface;
    one or more heating elements disposed within the housing adjacent the cooking surface;
    a motor disposed in the housing;
    a cooking vessel removeably supported on the cooking surface, the cooking vessel including an outer vessel having a bottom wall and a sidewall upwardly extending therefrom to define a cavity, and an inner vessel removeably received in the cavity of the outer vessel, the inner vessel including a vented bottom wall and a sidewall upwardly extending therefrom to define a cooking cavity;
    a stirring plate rotatably received within the cooking cavity of the inner vessel;
    a support grate having a plurality of apertures disposed therethrough, wherein the support grate is disposed within the cooking cavity of the inner vessel above the stirring plate to separate the cooking vessel between upper and lower portions, wherein the stirring plate is disposed within the lower portion of the cooking vessel; and
    a magnetic coupling system including an upper magnetic coupler disposed on the stirring plate and a lower magnetic coupler disposed in the housing and operably coupled to the motor, wherein the upper and lower magnetic couplers are magnetically coupled using one or more magnets when the cooking vessel is received on the cooking surface of the housing, and further wherein the lower magnetic coupler is configured to rotate the stirring plate within the cooking vessel as powered by the motor.

2. The sous vide cooking device of claim 1, wherein the sidewall of the outer vessel is spaced apart from the sidewall of the inner vessel to define a gap therebetween.

3. The sous vide cooking device of claim 2, wherein the gap at least partially defines a water circulation path within the cooking vessel.

4. The sous vide cooking device of claim 3, wherein the bottom wall of the outer vessel is spaced apart from the vented bottom wall of the inner vessel to define a spacing therebetween.

5. The sous vide cooking device of claim 4, wherein the spacing at least partially defines a water circulation path within the cooking vessel.

6. The sous vide cooking device of claim 1, wherein the stirring plate further includes a disk-shaped planar body portion having a plurality of blade members and slots disposed therethrough for driving water along a water circulation path.

7. The sous vide cooking device of claim 1, wherein the inner vessel includes a ledge disposed within the cooking cavity.

8. The sous vide cooking device of claim 7, wherein the support grate is supported on the ledge within the cooking cavity of the inner vessel.

9. A sous vide cooking device, comprising:
    an induction hob having a housing with an upper cooking surface;
    one or more heating elements disposed within the housing adjacent the cooking surface;
    a cooking vessel assembly supported on the cooking surface and configured to hold an amount of water for heating by the one or more heating elements, wherein the cooking vessel assembly includes an inner vessel received within a cavity of an outer vessel;
    a gap defined between outer surfaces of the inner vessel and inner surfaces of the outer vessel;
    a support grate having a plurality of apertures disposed therethrough, the support grate positioned above the stirring plate within a cooking cavity of the inner vessel to partition the cooking cavity of the inner vessel between upper and lower portions;
    a stirring plate received within the lower portion of the cooking cavity of the inner vessel and rotatably supported therein, the stirring plate having an upper magnetic coupler and one or more blade members disposed thereon;
    a lower magnetic coupler disposed in the housing and operably coupled to a motor for powering rotation of the lower magnetic coupler within an interior of the housing, wherein the upper and lower magnetic couplers are magnetically coupled using one or more magnets when the cooking vessel assembly is received on the upper cooking surface of the housing; and
    wherein water within the cooking vessel assembly is circulated along a water circulation path that is partially defined by the gap between the inner vessel and outer vessel upon rotation of the stirring plate.

10. The sous vide cooking device of claim 9, wherein the inner vessel further includes a vented bottom wall and a sidewall upwardly extending therefrom to define the cooking cavity.

11. The sous vide cooking device of claim 10, wherein the inner vessel further includes one or more standoff features extending downwardly from the vented bottom wall and abutting a bottom wall of the outer vessel to define a spacing between the bottom wall of the outer vessel and the vented bottom wall of the inner vessel.

12. The sous vide cooking device of claim 11, wherein the water circulation path is at least partially defined by the spacing between the inner vessel and the outer vessel.

13. The sous vide cooking device of claim 9, wherein the cooking cavity of the inner vessel includes a ledge disposed therearound, and further wherein the support grate is positioned on the ledge above the stirring plate within the cooking cavity of the inner vessel.

14. The sous vide cooking device of claim 9, including:
a temperature sensing device supported on a rim of the outer vessel and having a probe disposed within the gap defined between the inner vessel and outer vessel.

15. A sous vide cooking device, comprising:
an induction hob having one or more heating elements disposed within an interior of a housing and adjacent a cooking surface;
an outer vessel having a circumferential sidewall extending upwardly from a bottom wall to define a cavity, wherein the bottom wall of the outer vessel is configured to be abuttingly supported on the cooking surface of the induction hob;
an inner vessel having a circumferential sidewall extending upwardly from a vented bottom wall to define a cooking cavity, the inner vessel received in the cavity of the outer vessel and including one or more stand-off features extending downwardly from the vented bottom wall of the inner vessel to abuttingly support the inner vessel on the bottom wall of the outer vessel;
a gap defined between outer surfaces of the inner vessel and inner surfaces of the outer vessel;
a stirring plate received within the cooking cavity of the inner vessel and configured for rotation therein, the stirring plate having a generally planar body portion with slots disposed therethrough, wherein water disposed within the outer vessel is circulated upon rotation of the stirring plate along a water circulation path that is partially defined by the gap between the inner vessel and outer vessel and is further defined through the vented bottom wall of the inner vessel; and
a support grate having a plurality of apertures disposed therethrough, the support grate positioned above the stirring plate within the cooking cavity of the inner vessel.

16. The sous vide cooking device of claim 15, wherein the stirring plate includes an upper magnetic coupler and one or more blade members disposed thereon.

17. The sous vide cooking device of claim 16, including:
a lower magnetic coupler disposed in the housing of the induction hob and operably coupled to a motor for powering rotation of the lower magnetic coupler within an interior of the housing, wherein the upper and lower magnetic couplers are magnetically coupled using one or more magnets, such that a magnetic torque between the upper and lower magnetic couplers rotates the upper magnetic coupler and stirring plate when the lower magnetic coupler is rotated by the motor.

\* \* \* \* \*